2 Sheets—Sheet 1.
W. F. C. M. McCARTY.
Assignor of one-half to H. LEVIS, said LEVIS assignor to A. OHL and B. C. LAUTH.
PROCESS OF MANUFACTURING HYDROCARBON GAS.
No. 10,757. Reissued Aug. 17, 1886.
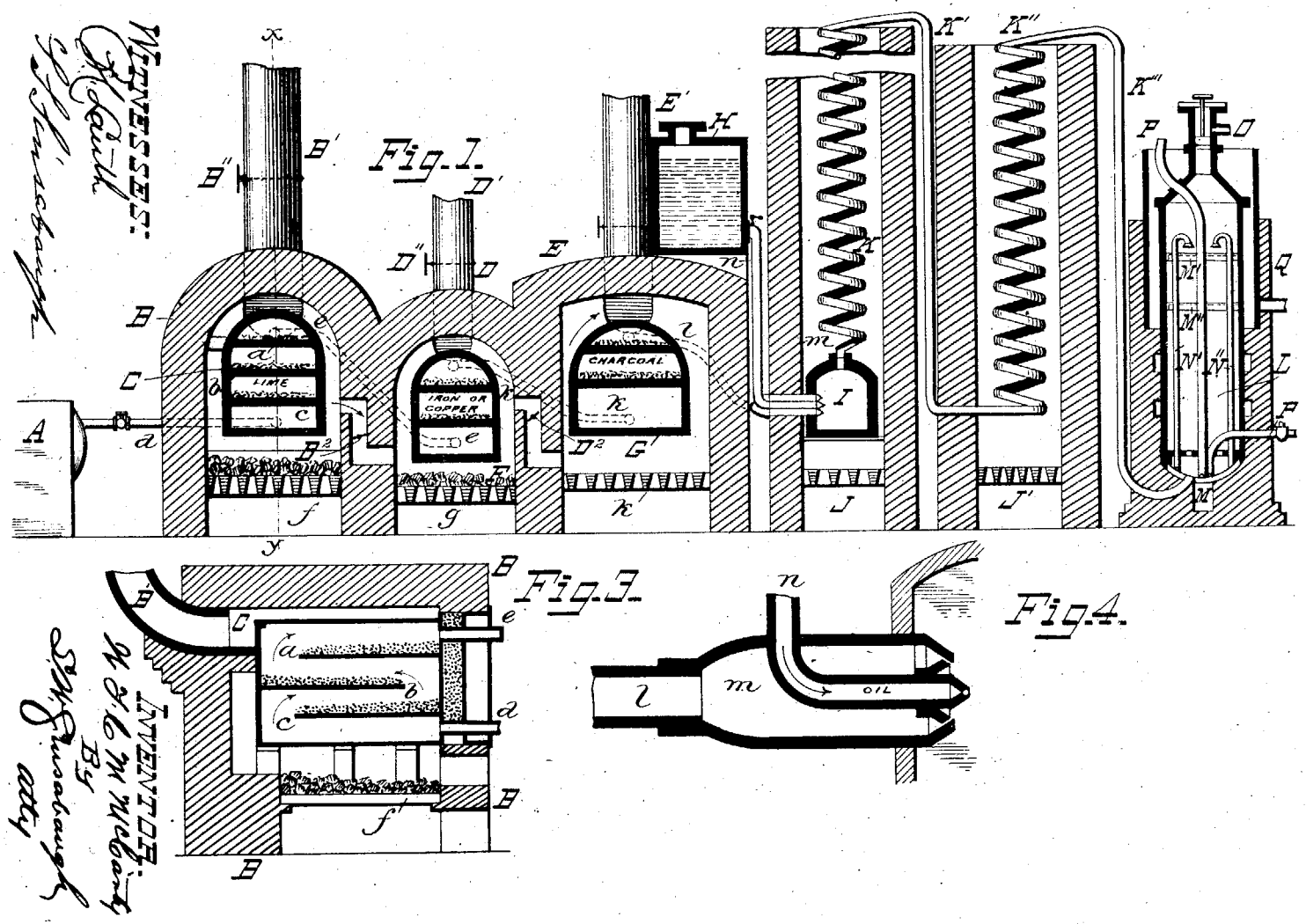
WITNESSES:
H. Lauth
S. S. Sinsabaugh
INVENTOR.
W. F. C. M. McCarty
By
S. W. Sinsabaugh
atty 2 Sheets—Sheet 2.
W. F. C. M. McCARTY.
Assignor of one-half to H. LEVIS, said LEVIS assignor to A. OHL and B. C. LAUTH.
PROCESS OF MANUFACTURING HYDROCARBON GAS.
No. 10,757. Reissued Aug. 17, 1886.
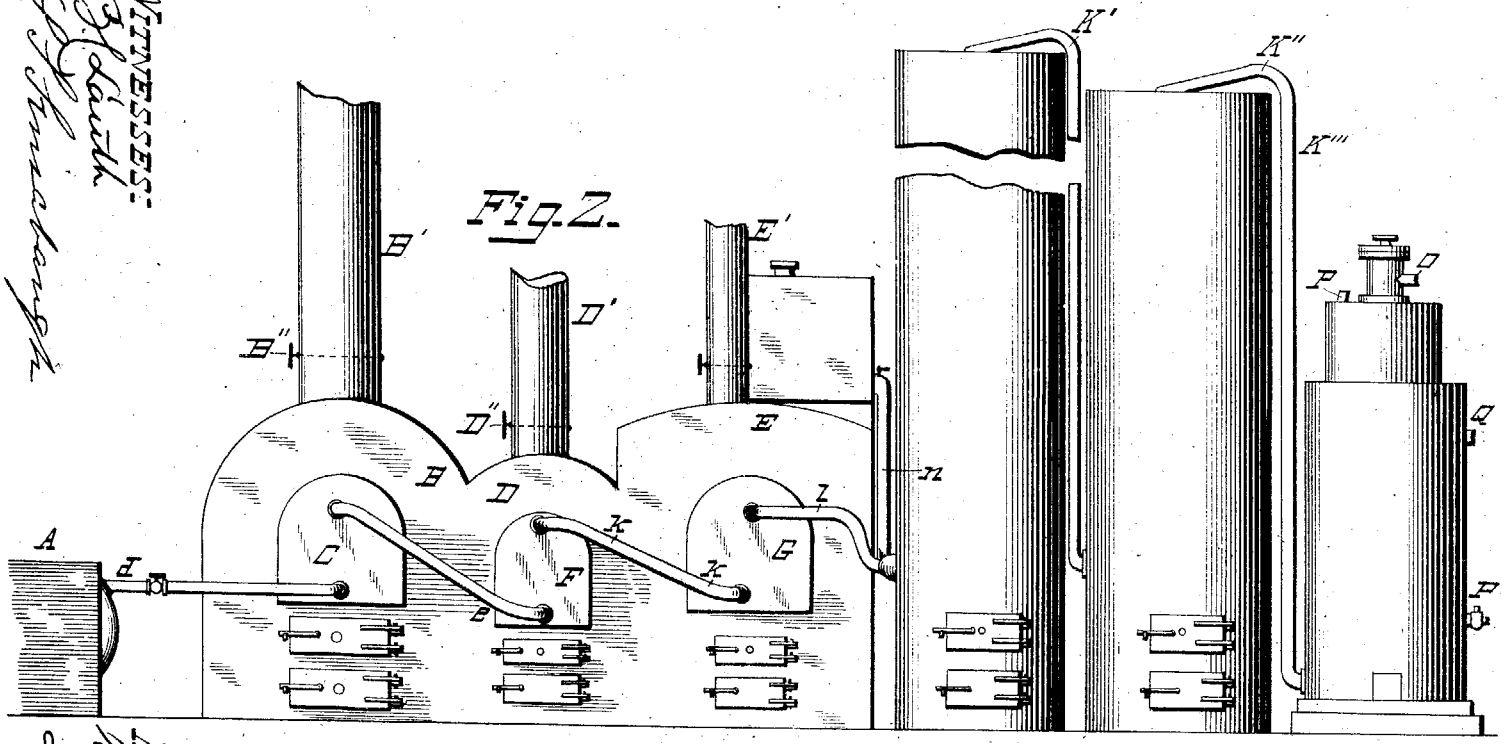
WITNESSES:
B. H. Lauth
S. P. Smisabaugh
INVENTOR:
W. F. C. M. McCarty
By
S. W. Ginsabaugh
atty

UNITED STATES PATENT OFFICE.

WILLIAM F. C. M. McCARTY, OF PITTSBURG, ASSIGNOR OF ONE-HALF TO HENRY LEVIS, OF PHILADELPHIA, PENNSYLVANIA; SAID LEVIS ASSIGNOR TO ADOLPH OHL AND BERNARD C. LAUTH, BOTH OF SAME PLACE.

PROCESS OF MANUFACTURING HYDROCARBON GAS.

SPECIFICATION forming part of Reissued Letters Patent No. 10,757, dated August 17, 1886.

Original No. 296,200, dated April 1, 1884. Application for reissue filed June 8, 1886. Serial No. 204,553.

*To all whom it may concern:*

Be it known that I, WILLIAM F. C. M. McCARTY, a citizen of the United States, residing at Pittsburg, Allegheny county, Pennsylvania, have invented a new and useful Process of Manufacturing Hydrocarbon Gas, of which the following is a specification.

The object of my invention is to cheaply obtain an illuminating-gas pure and free from oxygen and carbonic-oxide gas.

My invention consists in passing superheated steam over or in contact with a bed of heated or incandescent carbonate of lime or its equivalent, by means of which oxygen and carbonic oxide or carbonic acid present in the superheated steam will to a large extent be absorbed, and thence through or in contact with a heated mass of finely-divided iron or copper or other easily-oxidizable metal or material, and thence through or in contact with a bed of charcoal, with the result that any oxygen or carbonic oxide which has failed to have been removed from the steam in its passage over or through the mass of lime will be taken up or removed by the metal or charcoal and a pure hydrogen gas be obtained. This gas is introduced to a mixing-chamber, into which a liquid hydrocarbon is injected, whereby a mixture of hydrogen and hydrocarbon gas is obtained. This mixture is passed through a suitable heating-coil or heating-chamber, whereby the hydrogen and hydrocarbon gases become highly heated and fixed, and, after proper purification or washing, suited for illuminating purposes.

Apparatus well adapted to carry out the process above indicated is shown in the drawings, in which—

Figure 1 is a view partly in section and partly in elevation. Fig. 2 is a sectional elevation of the apparatus shown in Fig. 1. Fig. 3 is a central sectional view through the furnace B and combustion-flue B′ of Fig. 1; and Fig. 4 is a detailed sectional view of the injecting device, by means of which the hydrogen gas and liquid hydrocarbon are introduced to the mixing-chamber I of Fig. 1.

In the drawings the same letters of reference refer to similar parts wherever used.

B, D, and E are furnaces containing muffles C, F, and G. The construction of these three furnaces is similar, and may be understood by referring to Fig. 3, in which B represents the masonry of the furnace; C, a muffle of boiler-iron, which is provided with shelves *a b c*, and with induction and eduction pipes *d* and *e*.

*f* is the grate-bar, and B′ the combustion-flue. The combustion-flues B′, D′, and C′ are respectively provided with dampers B″, D″, and C″.

A is a steam-boiler or superheater of any suitable construction, provided with an eduction-pipe, *d*, opening into the muffle C.

*e* is a pipe leading from the top of the muffle C to the bottom of the muffle F, and *k* is a pipe leading from the top of the muffle F to the bottom of the muffle G.

*l* is a pipe leading from the top of the muffle G and opening into a mixing-chamber, I. The pipe *l* at its discharge end *m* is enlarged, and within this enlargement is introduced the discharge end of the pipe *n*, which leads from the hydrocarbon-holder H, the construction being such that the passage of the hydrogen gas through the pipe *l* and around the discharge end of the pipe *n* causes the ejection of the fluid hydrocarbon supplied from the tank or vessel H into the mixing-chamber I in a spray or finely-divided condition.

K is a coil leading from the mixing-chamber H upwardly through a stack or flue of masonry, and thence by a pipe, K′, downwardly into a second flue or stack having as a continuation of said pipe K′ a second coil, K″. The latter coil, by means of the pipe K‴, is caused to discharge into the bottom of a washer, L, set in proper brick-work and provided with a grate or fire-box, M. The washer L is provided with two circulating-pipes, N′ and N″, the lower open extremities of each of which reach nearly but not quite to the bottom of said vessel, the upper extremities being bent over and provided with rose ends or openings.

M and M″ are perforated diaphragms or sieves.

O is a gas-discharge opening, and Q is an opening for the discharge of the products of combustion from the fire-box M.

P P′ are pipes extending into the washer L, and having their open ends therein nearly but not quite in contact with the lower interior end of said chamber, the outer ends of said pipes being provided with suitable valves for closing the same.

The shelves *a b c* are provided with carbonate of lime, and the muffle F is upon its shelves provided with iron, copper, or other easily-oxidizable metal in a finely-divided condition, while the muffle G is upon its shelves provided with beds of charcoal. The materials are fed to said muffles by removing the plates from the front ends thereof and the luting by which they are held in place, after which the plates are replaced and luted in position. The muffles C and F, with their contents, are heated by means of fire upon the grate-bars *f* and *g* in the combustion-chambers B and D, respectively. I may here remark that the muffle of the furnace B may be charged with finely-divided iron or copper, and the muffle in the furnace D with carbonate of lime, without changing the nature of process. Steam is fed from the superheater or boiler A through the pipe *d* to the bottom of the muffle C, and passes backward and forward over and through the carbonate of lime contained upon the shelves of said muffle, whereby oxygen and such carbonic acid as may be present in said steam are to a large extent absorbed and removed therefrom. The hydrogen resulting with such impurities as it may contain is then conveyed by the pipe *e* to the bottom of the muffle F, where it is discharged and passes over and through the heated finely-divided iron or copper or equivalent material contained upon the shelves thereof, by which said gas is further purified from oxygen and carbonic-oxide gas. This purified gas is then, by means of the pipe *k*, conveyed to the lower part of the muffle G, at which point it is discharged in said muffle and passes over and through the bed of charcoal contained upon the shelves thereof, whereby its complete purification from oxygen and carbonic-oxide gas is insured. The purified and highly-heated hydrogen so obtained is then conveyed by the pipe *l* to the mixing-chamber I, and in its escape through the enlarged orifice *m* of the pipe *l* into said chamber causes the stream of liquid hydrocarbon fed by the pipe *n* from the holder H to be forced into said mixing-chamber I in a finely-divided condition or spray. This mixture of hydrocarbon and hydrogen gases then passes through the coil K, which has been highly heated by fire upon the grate-bars J, whereby said gases become more or less fixed. From the coil K through the pipe K′ this gas may be conveyed to a second coil, K″, heated by fire from the grate J′, whereby a perfect fixing of the gas may be insured. The fixed gas so obtained is then conveyed through the pipe K‴ to the washer L and discharged into said chamber, at the bottom thereof, said chamber having previously been supplied with hydrate of lime, ammonia, and water, or other suitable cleansing solution, the passage through which of said gas purifies the same and fits it for use, the purified gas being removed from said washer to a suitable storage-reservoir through the orifice O. The hydrocarbon gas introduced to the purifier L through the pipe K‴ is caused to come into more thorough contact with the cleansing solution in said chamber by reason of the fact that the heat arising from the fire-box M causes a circulation of the bath in the washer S upwardly through the pipes N′ N″, and a discharge of said mixture through the rose discharges on the upper ends of said pipes, respectively, and a consequent trickling of said solution downwardly through the perforated diaphragms M′ and M″, by which the upward current of gas comes intimately into contact with said purifying mixture.

The pipes P and P′ may be used to free the purifier L of its contents, pressure applied to one of these pipes causing the contents of said purifier to be ejected through the other.

$B^2$ and $D^2$ are flues connecting the combustion-chambers of the furnaces B and D and D and E, respectively, said flues being provided with dampers. This construction enables the retort of the combustion-chamber E to be heated by causing the currents of heat and the products of combustion from the furnaces B and D to pass through the furnace E and be discharged through the smoke-stack E′, whereby the charcoal of the muffle G may be purified of its oxygen and carbonic oxide, when such purification becomes necessary, instead of removing said charcoal from said muffle and replacing it by fresh supplies thereof.

Having thus described my invention, I claim—

1. The process of manufacturing hydrocarbon gas, which consists in passing superheated steam through or in contact with heated carbonate of lime and through or in contact with heated finely-divided metallic iron or copper, then mixing the gas so obtained with a liquid hydrocarbon and converting the mixture into a fixed gas by heat, as specified.

2. The process of manufacturing hydrocarbon gas, which consists in passing superheated steam through or in contact with heated carbonate of lime, through or in contact with heated finely-divided metallic iron or copper, and through or in contact with a mass of charcoal, then mixing the gas so obtained with a liquid hydrocarbon, and converting the mixture into a fixed gas by heat, as specified.

3. The process of manufacturing hydrocarbon gas, which consists in passing superheated steam through or in contact with heated carbonate of lime, through or in contact with heated finely divided metallic iron or copper, and through or in contact with a mass of charcoal, then mixing the gas so obtained with a liquid hydrocarbon and converting the mixture into a fixed gas by heat, and then purifying said gas by passing the same through a washer, as specified.

In testimony whereof I have hereunto signed my name.

WILLIAM F. C. M. McCARTY.

In presence of—

HENRY LEVIS,

L. W. SINSABAUGH.